PATENTED JAN 26 1971  3,557,743
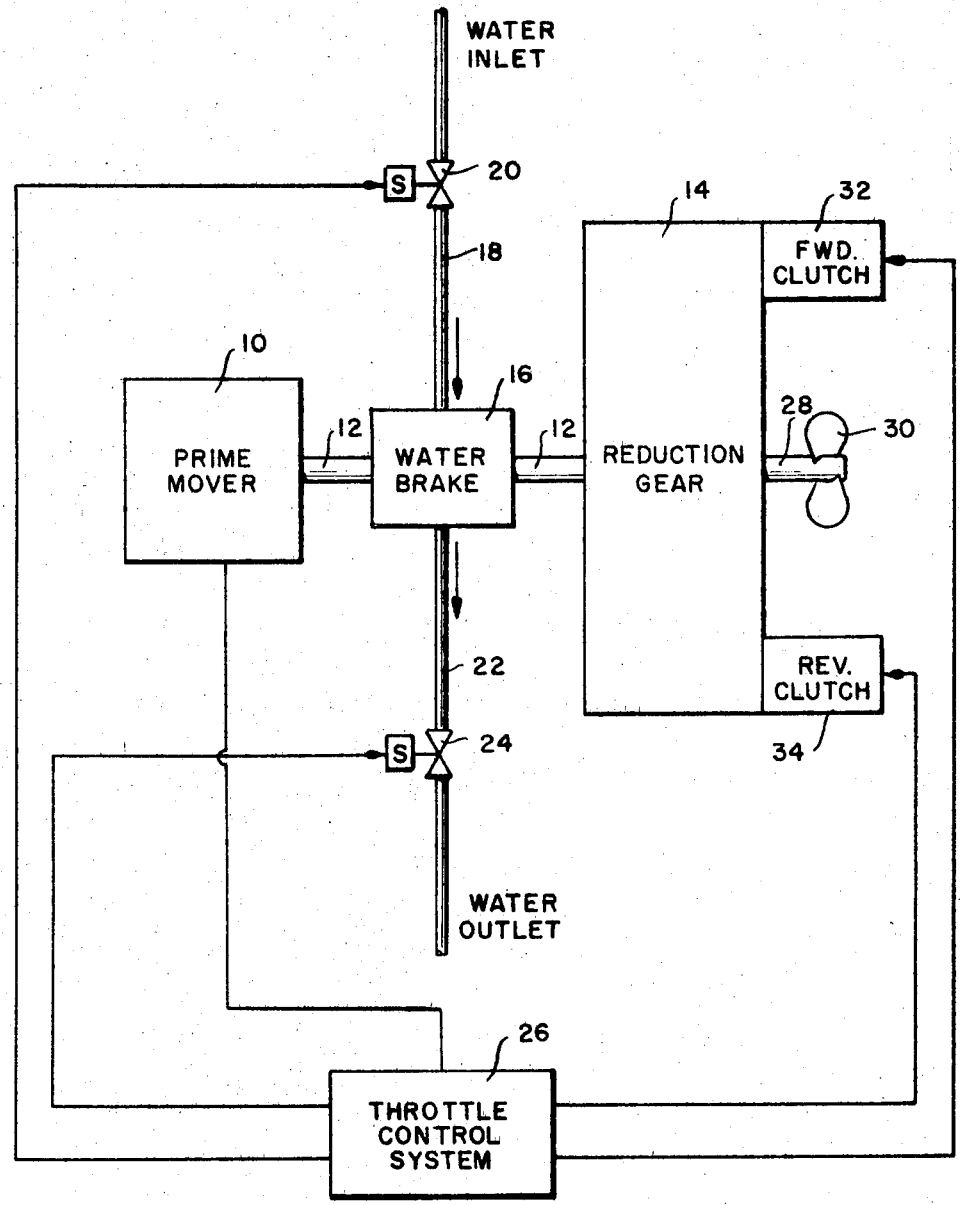
INVENTOR
CASIMIR J. RUBIS
Don M Gichan
AGENT
D E Hodges
ATTORNEY
BY

United States Patent

[11] 3,557,743

| [72] | Inventor | Casimir J. Rubis |
| | | Davidsonville, Ohio |
| [21] | Appl. No. | 779,410 |
| [22] | Filed | Nov. 27, 1968 |
| [45] | Patented | Jan. 26, 1971 |
| [73] | Assignee | The United States of America as represented by the Secretary of the Navy |

[54] SHIP'S PROPULSION CONTROL SYSTEM
3 Claims, 1 Drawing Fig.

[52] U.S. Cl. ................................................. 115/34
[51] Int. Cl. .................................................. B63h 1/14
[50] Field of Search ............................. 115/34, 0.5; 192/4, 4B, .094

[56] References Cited
UNITED STATES PATENTS
2,741,351  4/1956  Fletcher ...................... 115/34X FOREIGN PATENTS
183,349  4/1963  Sweden ...................... 192/4(B)
837,776  6/1960  Great Britain ................ 115/34

*Primary Examiner*—Trygve M. Blix
*Attorneys*—L.A. Miller, Q.E. Hodges, A. Sopp and D. McGiehan ABSTRACT: An automatic dynamic water braking reversal system for a ship's propulsion plant comprising a water brake on the shaft connecting the prime mover and the reduction gears, enabling rapid speed reduction of the propeller shaft thereby reducing the amount of energy required to be absorbed by the clutches used with an unidirectional prime mover and a reversible drive shaft. Additionally, the water brake may be used to load the engine to obtain lower idle speed operation.

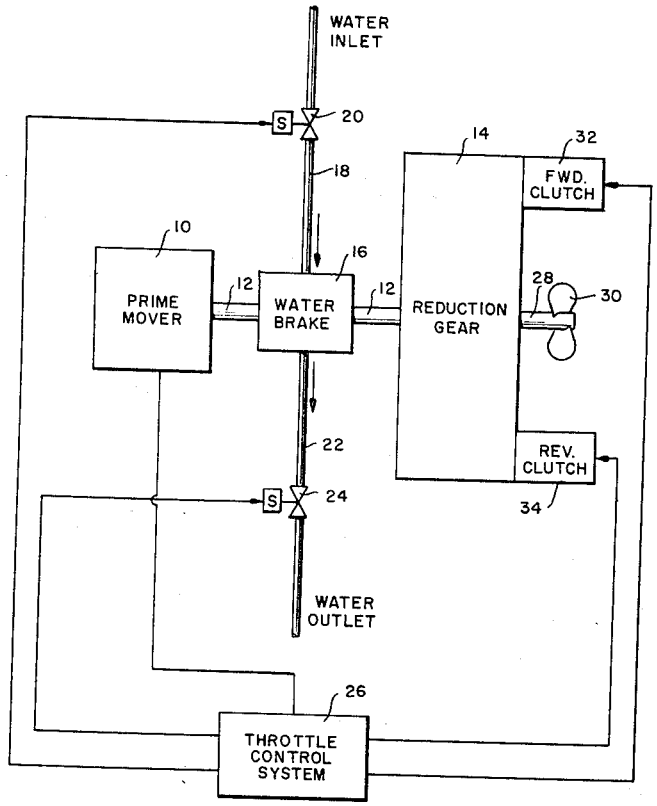

SHIP'S PROPULSION CONTROL SYSTEM

The invention described herein may be manufactured and used by or for the Government of the United States of America for governmental purposes without the payment of any royalties thereon or therefor.

BACKGROUND OF THE INVENTION

This invention relates generally to water brakes and more particular to a dynamic water brake for use with a ship's propulsion plant to enable rapid speed reduction of the propeller shaft to facilitate reversal of the propeller shaft by the forward and reverse gear clutches connected by gearing to the reduction gears. An advantage of the use of the dynamic water brake on the main propulsion shaft that drives the reduction gears is the ability to quickly reduce the speed of the output propeller shaft and thereby decrease the energy that would otherwise be absorbed by the forward and reverse clutches in changing the direction of rotation of the propeller shaft. This feature permits the use of smaller clutches or alternatively increases clutch life of the normally used large clutches.

The conventional methods of the prior art used for reversing the direction of rotation of the propeller shaft and thus the propeller thrust in ships using unidirectional prime movers, such as gas turbines, steam turbines, and some diesel engine, are electric drive, controllable-reversible-pitch propellers, or reversing gears. The use of electric drive using reversible electric motors, while providing a means of propeller thrust reversal has many disadvantages including high cost, relatively low efficiency, high weight and control complexity. Controllable-reversible-pitch propellers, while providing for extremely rapid and effective thrust reversal, have the disadvantage of high cost and complexity as well as being vulnerable to damage of the propeller or control system, precluding propeller pitch reversal at a critical moment. The reversing reduction gear offers an extremely attractive method of reversing propeller shaft direction except for its requirement of large forward and reverse clutches which must dissipate a substantial amount of energy in first reducing the speed of the propeller shaft and then reversing its direction. The clutches are therefore large in size, are heavy in weight, and are subject to overheating and subsequent burnout

SUMMARY OF THE INVENTION

The present invention overcomes the aforementioned disadvantages of the prior art by providing an automatic water brake and clutch control system which obviates the need for large clutches and thus prevents possible clutch burnout which may occur during propeller shaft slow down and reversal, say, for changes in ship's direction. According to the invention, a water brake is positioned on the drive shaft; that is on the shaft between the prime mover and the reduction gears. A water brake at this position is more efficient than when used on the propeller shaft itself, because of the higher efficiency obtainable in the water brake when used on a shaft rotating at high speed. Additionally the water brake used here may be of smaller size and weight for the same power absorbing capability as compared to one for use on the propeller shaft. A control system is employed to control the throttle of the prime mover, to actuate solenoid valves permitting flow into and out of the water brake cavity at the desired time, and to actuate the forward and reversing clutches all at the proper moment to effect complete shaft reversal.

Among the reduction gears to which this invention may be applied there are typically those of the "Falk" type similar to those used on many commercial and Navy ships. The forward and reverse clutches comprise one or more individual clutches connected in parallel. The gearing is so arranged that the aforementioned clutches are connected to and drive separate gears which mesh with the main reduction or "bull" gear to effect rotation in opposite directions. The clutches are arranged with protective interlocks which preclude the possibility of simultaneously engaging both clutches. These clutches are generally of the friction type having large disc faces, and when effecting the propeller shaft reversal, a large amount of heat is generated in the clutch being engaged.

According to this invention a water brake is attached to the main propulsion shaft at a location between the prime mover and the reduction gear where it will readily decelerate the main propulsion shaft as well as the propeller shaft through the reduction gears. When the shafts are almost stopped the forward clutch is disengaged. The propeller shaft continues to rotate due to momentum and windmilling of the propeller as he the ship continues to move through the water. The reverse clutch is then engaged to reverse direction of the propeller shaft. The water brake is emptied to again eliminate resistance to rotation.

The water brake absorbs only a small amount of power when it is turning in air when the water brake cavity is empty. When deceleration of the shaft is desired, solenoid valves in water lines to the water brake are opened, and the water brake cavity rapidly fills with water, causing an immediate large absorption of power by the water brake, and thereby decelerating the shaft quickly. When appropriate, the forward clutch is disengaged, and the reverse clutch is engaged thus rapidly reversing the propeller shaft without the necessity of reversing the prime mover. While it has been found that when the water brake is turning in air, small amounts of power are absorbed under normal operating conditions, it is often desirable to draw a vacuum on the cavity to further reduce the amount of power absorbed.

It has been found that some types of prime movers, as for example gas turbines, have a relatively high idle speed which is desirable to reduce for maneuvering. Therefore, for low speed maneuvering of the ship, the water brake may be partially filled with water to absorb a sufficient amount of energy to reduce the speed of rotation of the prime mover to an acceptable level.

Accordingly, it is the primary object of this invention to provide an automatic dynamic water brake and reversal system for a ship's propulsion unit to permit rapid shaft deceleration and thereby facilitate propeller thrust reversal.

Another object of this invention is to provide a water brake on a ship's propulsion unit to facilitate shaft reversal so as to reduce consequent wear on the forward and reverse clutches associated with a reversing reduction gear.

Still another object of this invention is to provide a water brake on a ship's main propulsion unit to permit the use of smaller forward and reverse clutches used on the reversing gear.

Still another object of this invention is to use a water brake on a ship's main propulsion unit to reduce the normal idle speed of the prime mover to provide lower ship's maneuvering speed by partially loading said prime mover.

These and other attendant advantages and objects of the invention will become apparent to those skilled in the art upon reference to the accompanying specification, claims and drawings in which:

BRIEF DESCRIPTION OF THE DRAWING

The FIG. is a schematic of an automatic dynamic water brake system for controlling the reversal of the ship's propeller thrust.

DESCRIPTION OF THE PREFERRED EMBODIMENT

Referring now to the FIG. there is shown for purposes of illustration only a prime mover 10 of the unidirectional type which may for example be a gas turbine, or a nonreversible diesel engine.

Prime mover 10 is attached for rotation to a main propulsion shaft 12 which is subsequently connected for rotation to the input of the reduction gear 14. Attached to the main propulsion shaft 12 is a water brake 16 wherein an impeller is fixed for rotation to the shaft 12 and rotating in a cavity which may be controllably filled with or emptied of water by automatic means, A water inlet 18 is fluidly connected to the cavity of the water brake the flow through which is controlled by an electrically actuated solenoid valve 20. Also attached to the cavity of the water brake 16 is a water outlet 22 the flow through which is controlled by an electrically actuated solenoid valve 24. The inlet solenoid 20 and the outlet solenoid 24 are electrically connected to the throttle control system 26 the operation of which will be described subsequently.

Attached for rotation to the reduction gear 14 there is an output propeller shaft 28 having attached thereto a propeller 30 of the fixed pitch type for providing either forward or reverse thrust depending upon rotative direction.

An electrically actuatable forward clutch 32 is connected through gearing to the reduction gear 14 and when actuated, causes the propeller shaft 28 and propeller 30 to rotate in a direction to create forward thrust on the ship. An electrically actuatable reverse clutch 34 is connected through gearing to the reduction gear 14 and when actuated causes the propeller shaft 28 and propeller 30 to rotate in an opposite direction such that it produces reverse thrust on the ship. The forward clutch 32 and the reverse clutch 34 are electrically connected to the throttle control system 26 for selective actuation.

DESCRIPTION OF THE OPERATION

Under normal operating conditions, as for example when the ship is travelling at cruising speed, power is delivered by unidirectional prime mover 10 through the main propulsion shaft 12 to the reduction gear 14. The reduction gear 14 transmits its torque at a lower shaft speed to the propeller shaft 28 and propeller 30 operating in the buoyant medium of the ship in a conventional manner. The cavity of the water brake 16, attached to the main propulsion shaft 12, is devoid of water so that the water brake impeller does not substantially absorb any energy produced by the prime mover 10. It is to be understood that a vacuum may be drawn on the cavity of the water brake 16 to further reduce the impedance created thereby.

For slowing down the ship and for subsequent reversal of the propeller thrust, the throttle control system 26 operates the prime mover throttle and the inlet solenoid valve 20 to cause water to flow into the cavity of the water brakes 16 via the inlet 18. The outlet solenoid 24 may be opened to permit the outflow of air in the water brake cavity displaced by the in rush of water coming from the water inlet 18, and thus permitting rapid filling of and continued flow of water into the water brake cavity. This causes an immediate large impedance on the main propulsion shaft 12 and a consequent large absorption of power by the water brake and thereby rapidly decelerate the shaft. When appropriate, that is, when the propeller shaft 28 is stopped or almost stopped, the forward clutch 32 is disengaged by electrical signals from the throttle control system 26. At this point in time, the propeller shaft 28 and propeller 30 is disconnected from the gearing in the reduction gear 14. The reverse clutch 34 is then engaged to connect the propeller shaft 28 for rotation to the gears of the reduction gear 14 to rotate it in a reverse direction. Reverse clutch 34 is electrically connected to the throttle control system 26 which produces such electrical signals as it required to actuate the reverse clutch 34. The throttle control system 26 then produces and electrical signal to enable continued opening of the outlet solenoid 24 to empty the cavity of water brake 16 at the end of a maneuver to eliminate the impedance on the main propulsion shaft 12. The throttle control system then operates the throttle of the prime mover to increase reverse thrust on the ship.

As can be readily seen, to go from a reverse thrust condition to a forward thrust condition, the operation by the throttle control system 26 is substantially opposite in controlling the time when the reverse clutch 34 and the forward clutch 32 are actuated.

It is to be understood that the invention is not limited to the exact details of the construction shown and described for obvious a modifications will occur to persons skilled in the art.

I claim:

1. An automatic dynamic brake and reversal system for a ship's propulsion unit utilizing a unidirectional prime mover connected by a main propulsion shaft to reversible reduction gears, said gears being connected to a propeller shaft comprising:
   a continuously operating water brake attached to the main propulsion shaft between the prime mover and the reduction gears;
   a forward clutch for engaging the reduction gears to the propeller shaft to produce reverse thrust on the ship;
   a throttle control system for sequentially controlling the throttle of the prime mover, the flow of water to and from said water brake and for engaging and disengaging said clutches, whereby said water brake provides a continuously controlled leading force on said prime mover thereby enabling said propeller shaft to be operated over a range of speeds including a lower idle speed.

2. The system of claim 1, wherein the flow of water to and from said water brake is regulated by solenoid valves.

3. The system of claim 2, including means in said throttle control system for transmitting electrical signals to said solenoid valves, said throttle, and said clutches, whereby sequential control of said valves, throttle and clutches may be enabled.
   a reverse clutch for engaging the reduction gears to the propeller shaft to produce reverse thrust on the ship; and